United States Patent
Soong et al.

(10) Patent No.: US 8,928,273 B2
(45) Date of Patent: Jan. 6, 2015

(54) DISPLAY DEVICE FOR DISPLAYING INFORMATION OF RECHARGEABLE BATTERY OF ELECTRIC VEHICLE AND CHARGING MODULE HAVING THE DISPLAY DEVICE

(75) Inventors: Tzu-Wen Soong, New Taipei (TW); Hung-Lan Lin, New Taipei (TW)

(73) Assignee: Go-Tech Energy Co. Ltd., New Taipei (TW)

( * ) Notice: Subject to any disclaimer, the term of this patent is extended or adjusted under 35 U.S.C. 154(b) by 655 days.

(21) Appl. No.: 13/082,589

(22) Filed: Apr. 8, 2011

(65) Prior Publication Data

US 2012/0256587 A1    Oct. 11, 2012

(51) Int. Cl.
   *H02J 7/14*   (2006.01)
   *H02J 7/00*   (2006.01)

(52) U.S. Cl.
   CPC .......... *H02J 7/0021* (2013.01); *B60L 2250/16* (2013.01); *H02J 2007/0001* (2013.01); *Y02T 10/7055* (2013.01)
   USPC ............................ 320/104; 320/109; 320/132

(58) Field of Classification Search
   CPC .. Y02T 10/7044; Y02T 90/12; B60L 2250/16
   USPC .......... 320/104, 105, 109, 132, 134; 324/426, 324/427
   See application file for complete search history.

(56) References Cited

U.S. PATENT DOCUMENTS

| | | | | |
|---|---|---|---|---|
| 8,232,875 | B2* | 7/2012 | Uchida | 340/455 |
| 2004/0169489 | A1* | 9/2004 | Hobbs | 320/104 |
| 2009/0021218 | A1* | 1/2009 | Kelty et al. | 320/137 |
| 2009/0326749 | A1* | 12/2009 | Uchida | 701/22 |
| 2012/0049793 | A1* | 3/2012 | Ross et al. | 320/109 |

FOREIGN PATENT DOCUMENTS

| | | |
|---|---|---|
| CN | 101512364 A | 8/2009 |
| CN | 101821121 A | 9/2010 |
| TW | 201039534 A | 11/2010 |

OTHER PUBLICATIONS

Taiwanese Office Action of corresponding Taiwan Application No. 10221416170 dated Oct. 21, 2013.
Chinese Office Action of corresponding Chinese Application No. 201110266059.1 dated Dec. 4, 2013.

* cited by examiner

*Primary Examiner* — Edward Tso
*Assistant Examiner* — Aaron Piggush
(74) *Attorney, Agent, or Firm* — Che-Yang Chen; Law Office of Michael Chen

(57) ABSTRACT

A display device for displaying information of a rechargeable battery of an electric vehicle and a charging module using the display device are disclosed in the present invention. The display device includes a battery capacity unit, a lifetime unit, an information collecting unit and a display unit. It can display the charging state, lifetime, cycle count and health state of the rechargeable battery. The charging module includes a power unit for providing power. It can display battery information when charging the rechargeable battery. The invention provides a convenient way to let customers know the status of the batteries of their electric vehicles and decide if the batteries need to be charged or replaced.

9 Claims, 5 Drawing Sheets

DISPLAY DEVICE FOR DISPLAYING INFORMATION OF RECHARGEABLE BATTERY OF ELECTRIC VEHICLE AND CHARGING MODULE HAVING THE DISPLAY DEVICE

FIELD OF THE INVENTION

The present invention relates to a display device and a charging module having the display device. More particularly, the present invention relates to a display device showing information of a rechargeable battery of an electric vehicle and the charging module having the display device.

BACKGROUND OF THE INVENTION

An electric vehicle, also referred to as an electric drive vehicle, is a moving vehicle using one or more electric motors as driving system. Not like petroleum-based transportations which are moved by the energy from burning gasoline, the electric vehicles use electric power as their propulsion. They won't generate waste gas. Noise is also less. During the last few decades, increased concern over the environmental impact of the petroleum-based transportation, along with the spectre of peak oil, has led to renewed interest in an electric transportation. Electric power for electric vehicles can be generated from a wide range of sources, including fossil fuels, nuclear power, and renewable sources such as tidal power, solar power, and wind or any combination of those.

In the past, an electric vehicle consumes huge electric power due to their power system. The electric power can only be transmitted to the car through overhead lines. This infrastructure makes the electric vehicles impossible to be popular. Only some of public transportations have access to it. Routes of the public transportation are strictly limited by the lined arrangement. With the development in power systems of electric vehicles, especially in batteries, the electric vehicles become a future star and more and more sources are devoted in this field.

No matter what appearance (bus, truck or motorcycle) the electric vehicle is, the batteries or battery set plays a key part in the car. Charging time becomes shorter from tens of hours to several hours. Battery capacity also glows up very fast. The car can keep running for hours with more than 100 miles and need no charge. Size of batteries also reduces significantly. Obviously, smaller size makes the battery to be separately portable. People who drive the car can easily find some charging station for charging or replace a full charged battery in their house. The only concern is lifetime of the battery. Besides, a method or device to detect batteries to be charged is required.

Some existing inventions have shown devices or methods for detecting and displaying battery information. A prior art is disclosed in FIG. 1. It is capable of displaying the absolute residual ratio of a rechargeable battery associated with the state of degradation, the memory effect, and relative residual ratio of residual amounts to actual amounts for observing individual use environments. It further provides a battery state displaying device for electric vehicles, which can, according to the memory effect, display the states of battery charging, battery life, battery replacement, etc.

A battery state display device 101 for electric vehicles for displaying the states, such as residual capacity, of a rechargeable battery 100, comprises: a display means 102 for displaying the battery states; an absolute residual ratio algorithm means 103 for obtaining the ratio of the residual amount to the initial amount of the rechargeable battery (absolute residual ratio); a relative residual ratio algorithm means 104 for obtaining the ratio of the residual amount to the actual amount of the rechargeable battery 100 (relative residual ratio); a charging ratio algorithm means 105 for obtaining the ratio of the capacity of the chargeable battery during charging to the initial capacity or actual capacity; and a display control means 106 for switching any one of the absolute residual ratio, relative residual ratio, and charging rate thus obtained to the display means 102 for display.

Although the prior art discloses a device for showing battery information, it can not meet the requirements mentioned above. First, it is equipped in an electric vehicle or battery to display battery information. However, a device, placed outside of the electric vehicle or battery, to detect battery is needed. Second, the prior art can not display cycle count of the rechargeable battery. The cycle count relates to lifetime of the battery. When it comes close to the designed cycle count, the battery should be replaced in case any problem happens to the battery.

Therefore, a display device for showing information of a rechargeable battery of an electric vehicle and a charging module using the display device is desirable to complete the electric vehicle charging system.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, a display device for displaying information of a rechargeable battery of an electric vehicle, comprises: a battery capacity unit, for detecting charging state of the rechargeable battery; a lifetime unit, for detecting lifetime of the rechargeable battery; an information collecting unit, for determining cycle count and health state of the rechargeable battery; and a display unit, connected to the battery capacity unit, lifetime unit and information collecting unit, for displaying the charging state, lifetime, cycle count and health state of the rechargeable battery on a charging device outside of the rechargeable battery such that information of the rechargeable battery is shown on the charging device while electrically connected to the rechargeable battery.

Preferably, the display device further comprises a converter for converting the charging state, lifetime, cycle count and health state of the rechargeable battery into user-friendly data before displayed by the display unit.

Preferably, the display device further comprises a transmitter for transmitting the charging state, lifetime, cycle count and health state of the rechargeable battery to a remote computer via local area network (LAN), wide area network (WAN), wireless LAN or wireless WAN.

Preferably, the display device further comprises a processor for confirming identification of the rechargeable battery, wherein the rechargeable battery is charged only when confirmation is positive.

Preferably, the display device further comprises a power unit for providing power.

Preferably, the display device is powered by the charging device.

Preferably, the display device further comprises a memory unit for recording the charging state, lifetime, cycle count and health state of the rechargeable battery each time when the rechargeable battery is connected to the display device.

Preferably, the display unit is a liquid crystal display (LCD) or light emitting diode (LED) indicators.

Preferably, the information collecting unit calculates remaining capacity to full charge and health state of the rechargeable battery.

In accordance with another aspect of the present invention, a charging module for charging a rechargeable battery of an electric vehicle includes: a charging unit, for providing electric power to the rechargeable battery; and a display device mentioned above.

DETAILED DESCRIPTION OF THE PREFERRED EMBODIMENTS

Figure 1:
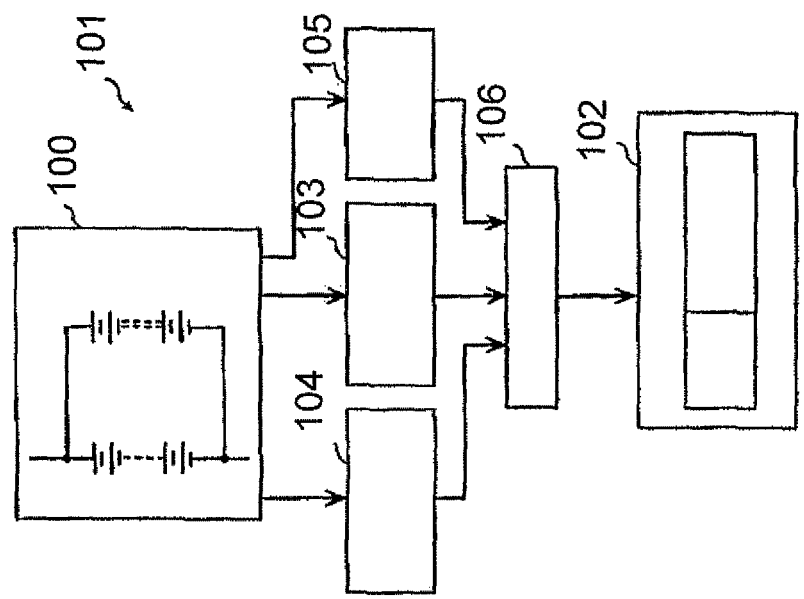
FIG. 1 shows a battery information display of a prior art.
Figure 2:
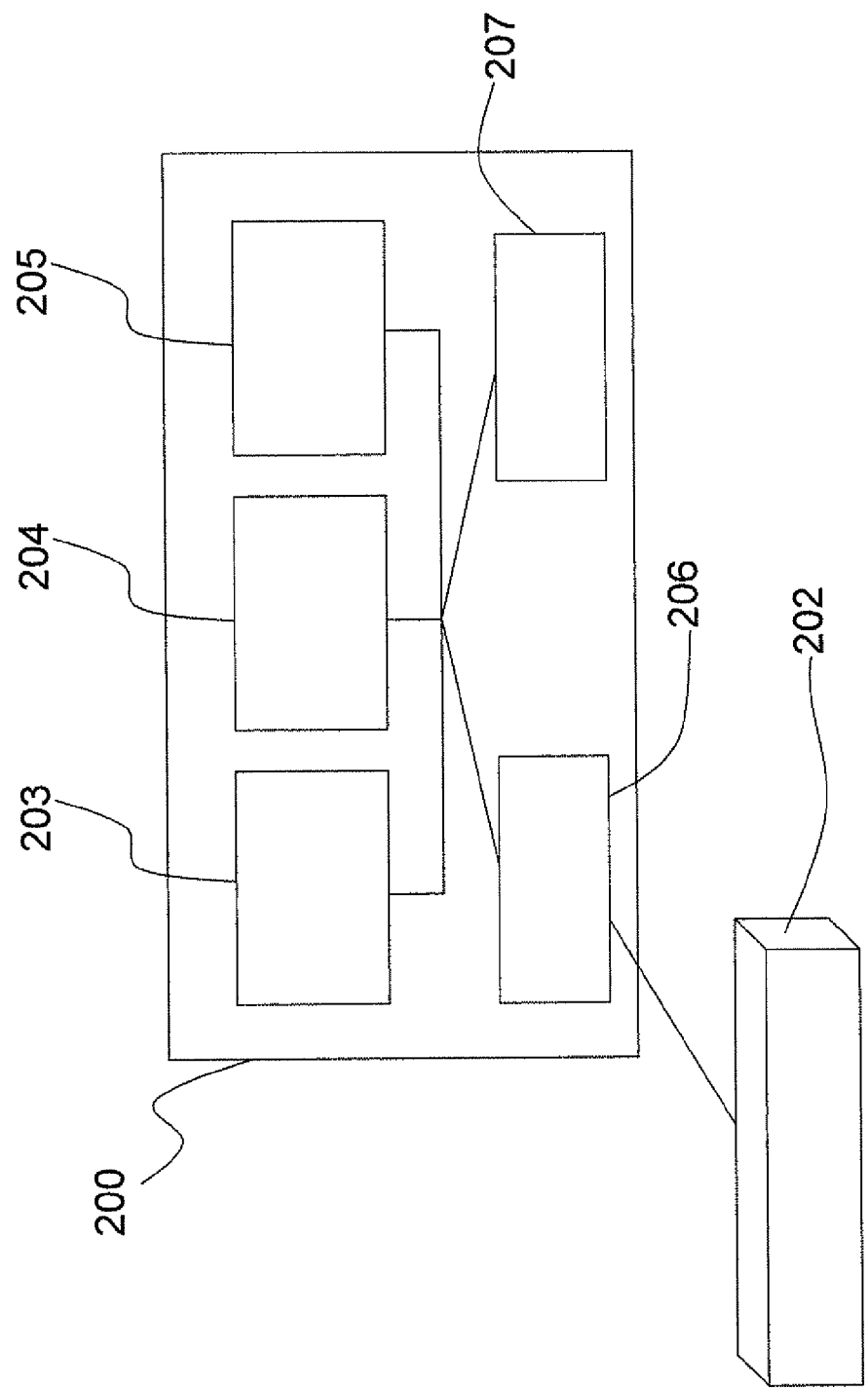
FIG. 2 shows a first embodiment of a display device for displaying information of a rechargeable battery of an electric vehicle.

The present invention will now be described more specifically with reference to the following three embodiments.
First Embodiment Please refer to FIG. 2 and FIG. 3. A display device 200 is illustrated in FIG. 2. The display device 200 displays information of a rechargeable battery 250 of an electric vehicle (not shown). It has a battery capacity unit 203, lifetime unit 204 and information collecting unit 205. Meanwhile, the display device 200 has a display unit 202 which can be installed outside of a charging device 210.

The battery capacity unit 203 detects charging state of the rechargeable battery 250. It can determine the ratio of energy stored to the full capacity. The charging stage can be decided by matching the voltage value read from the rechargeable battery 250 on a calibration curve of output voltage with time of charging. The lifetime unit 204 detects lifetime of the rechargeable battery 250. If the rechargeable battery 250 is going to fail, for example, when the available capacity drops very fast no matter how long the rechargeable battery 250 is charged, the lifetime unit 204 can send a message to show such a situation. In this embodiment, the lifetime unit 204 will show an alarm message on the display unit 202.

The information collecting unit 205 determines cycle count and health state of the rechargeable battery 250. Cycle count means the charging times of the rechargeable battery 250. Usually, a rechargeable battery needs to be replaced after 400 counts or more. The display unit 202 is connected to the battery capacity unit 203, lifetime unit 204 and information collecting unit 205. It displays the charging state, lifetime, cycle count and health state of the rechargeable battery 250 on the charging device 210 outside of the rechargeable battery 250 while electrically connected to the rechargeable battery 250. The information collecting unit 205 calculates remaining capacity to full charge so that the display unit 202 can display the remaining capacity and health state of the rechargeable battery 250.

In this embodiment, the display unit 202 is a liquid crystal display (LCD). An alphabetic interface is used in the liquid crystal display. Since the present invention is not limited to any interface, the interface can be graphic or mixture of both.

The display device 200 further comprises a converter 206. The converter 206 converts the charging state, lifetime, cycle count and health state of the rechargeable battery 250 into user-friendly data before displayed by the display unit 202. That is to say, the information displayed on the alphabetic interface is translated by the converter 206. Of course, in practice, the display unit 202 can be a number of light emitting diode (LED) indicators. For example, a green light shows full charge of the rechargeable battery 250, a blinking red light indicates end of life of the rechargeable battery 250, etc.

In addition, the display device 200 further comprises a transmitter 207. The transmitter 207 transmits the charging state, lifetime, cycle count and health state of the rechargeable battery 250 to a remote computer (not shown) via local area network (LAN), wide area network (WAN), wireless LAN or wireless WAN. Thus, a remote control center (not shown) is able to charge the rechargeable battery 250 while check the battery information. The transmitter 207 plays a key role to set up a charging station without service personnel. The transmitter 207 can transmit the information via wireless means or cable, depending on the need of use.

Figure 3:
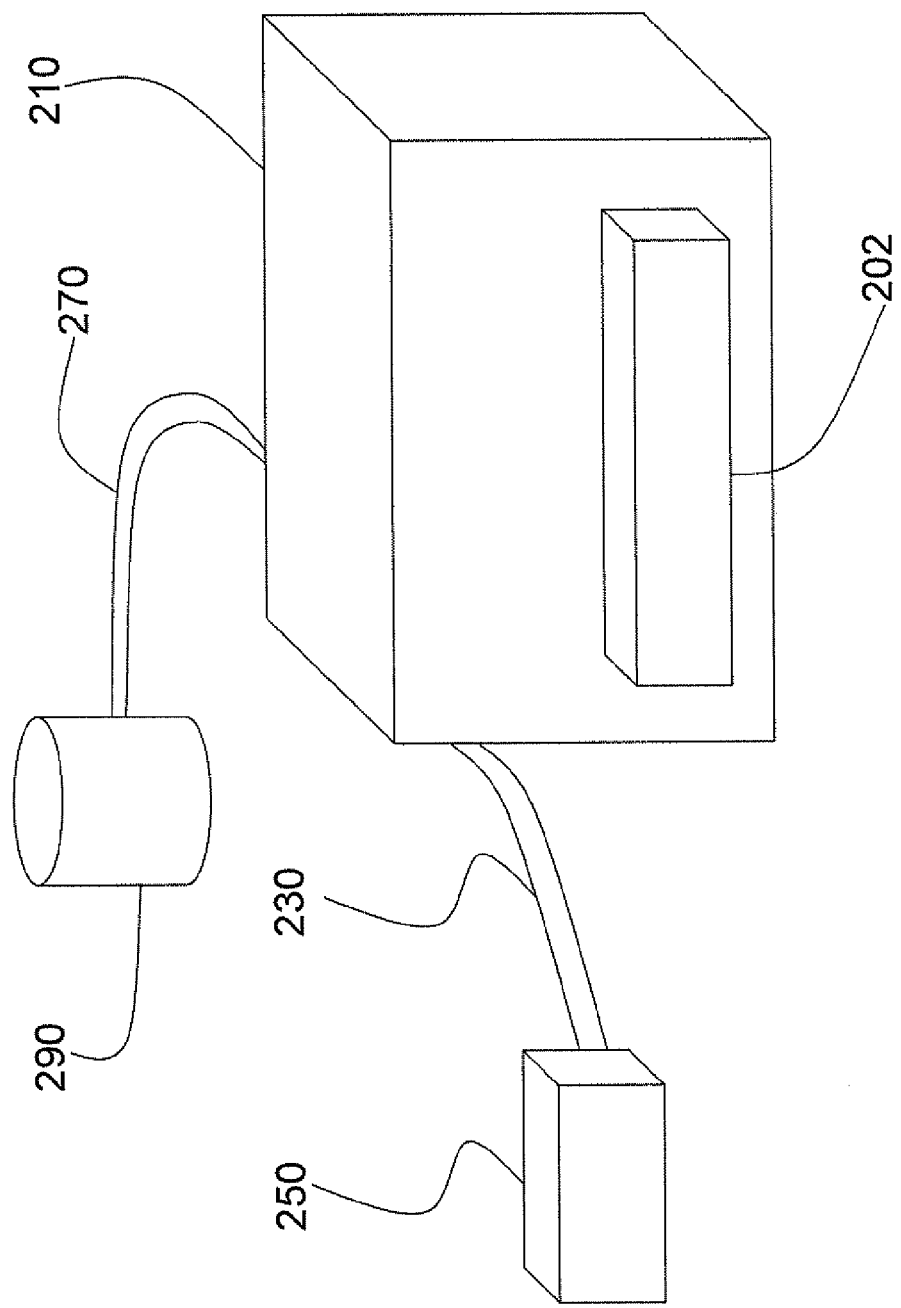
FIG. 3 shows a display unit on a charging device in the first embodiment.

As to the details of the charging device 210, please refer to FIG. 3. The charging device 210 has a wire 270 linked to a power source 290. It also has a charging cable 230 connected to the rechargeable battery 250. A charging system is thus formed.

Figure 4:
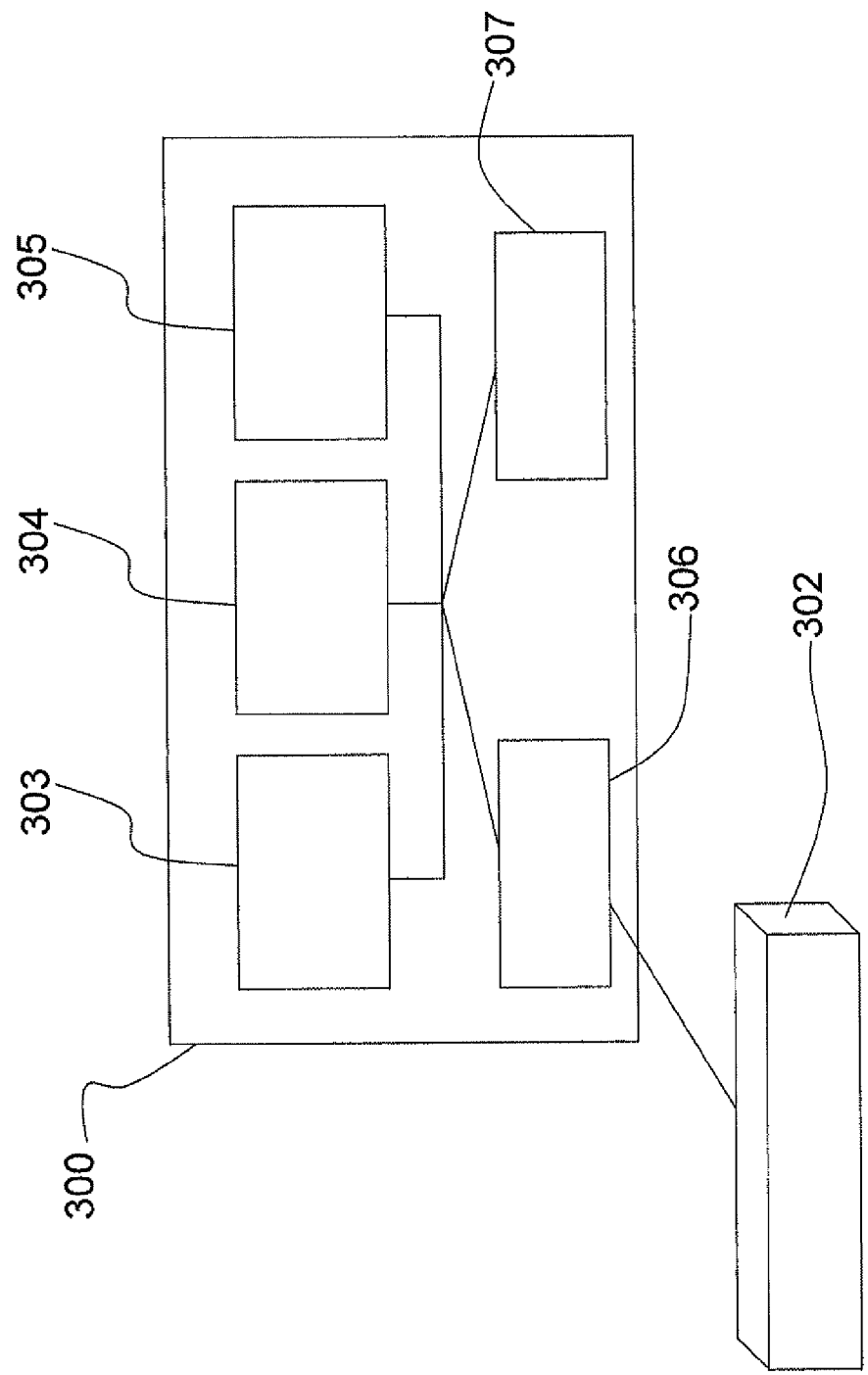
FIG. 4 shows a second embodiment of a display device for displaying information of a rechargeable battery of an electric vehicle.

The first embodiment discloses a design of a display unit according to the spirit of the present invention. More applications of the present invention will be illustrated in the following embodiments.
Second Embodiment Please refer to FIG. 4. A second embodiment is disclosed. A display device 300 can display information of the rechargeable battery 250. Like the display device 200 in the first embodiment, the display device 300 has a battery capacity unit 303, lifetime unit 304 and information collecting unit 305. As well, the display device 300 has a display unit 302 installed outside of a charging device (not shown). Functions of the battery capacity unit 303, lifetime unit 304 and information collecting unit 305 are the same as those of the battery capacity unit 203, lifetime unit 204 and information collecting unit 205 in the first embodiment. The descriptions thereof are herein omitted.

Figure 5:
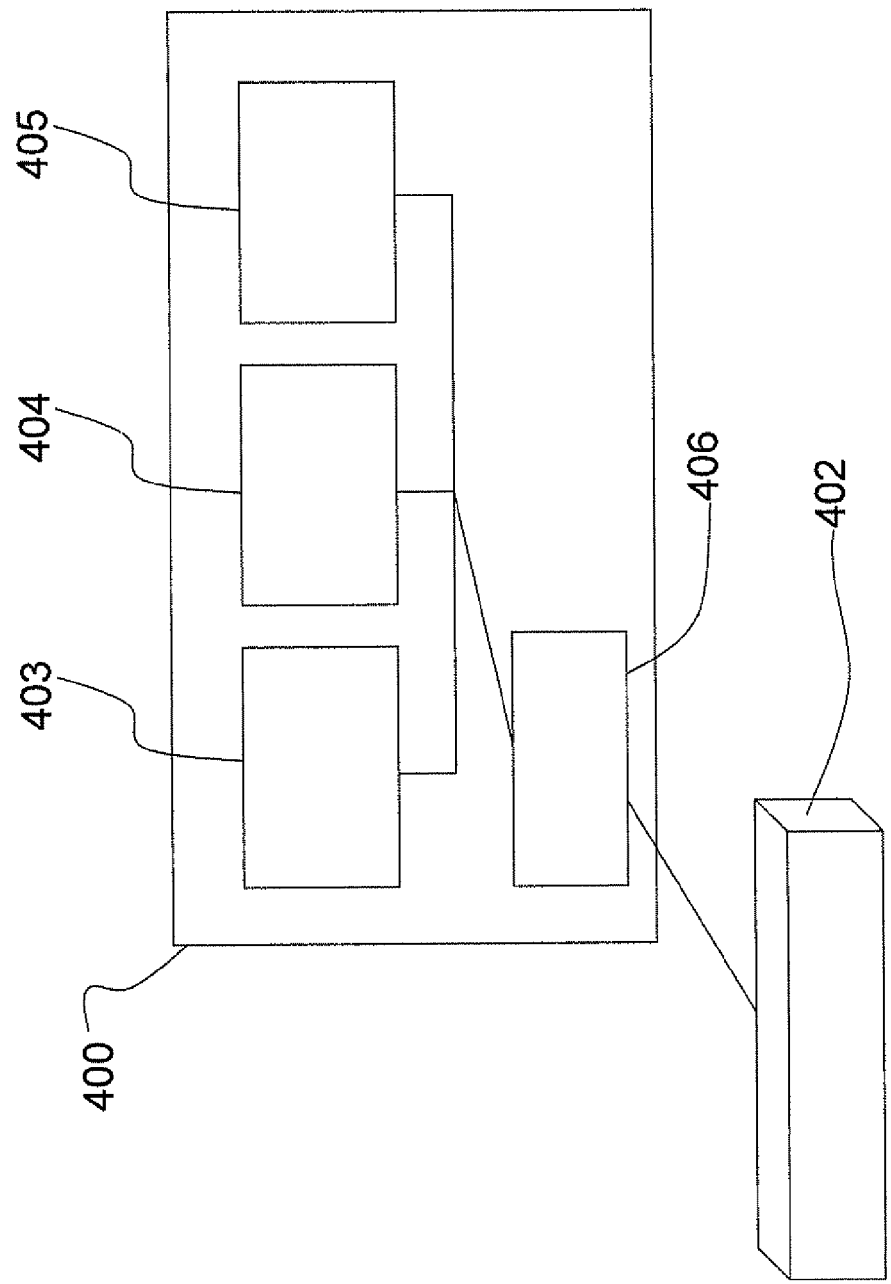
FIG. 5 shows a third embodiment of a display device for displaying information of a rechargeable battery of an electric vehicle.

Different from the first embodiment, the display device 300 has a processor 306. It confirms identification of the rechargeable battery 250. The rechargeable battery 250 will be charged only when the confirmation is positive. The confirmed message can also be shown on the display unit 302. Additionally, the display device 300 has a power unit 307 which provides power to the display device 300, and can be any kind of batteries. If the power unit 307 is a rechargeable battery, it can be powered by the charging device while the rechargeable battery 250 is charged.
Third Embodiment Please refer to FIG. 5. A third embodiment is disclosed. A display device 400 can display information of the rechargeable battery 250. Like the display device 200 in the first embodiment, it has a battery capacity unit 403, lifetime unit 404 and information collecting unit 405. As well, the display device 400 has a display unit 402 installed outside of a charging device (not shown). Functions of the battery capacity unit 403, lifetime unit 404 and information collecting unit 405 are the same as those of the battery capacity unit 203, lifetime unit 204 and information collecting unit 205 in the first embodiment. The descriptions thereof are herein omitted.

The display device 400 further has a memory unit 406 for recording the charging state, lifetime, cycle count and health state of the rechargeable battery 250 each time when the rechargeable battery 250 is connected to the display device 400. Thus, the information allows users to know the current status of their battery.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A display device for displaying information of a rechargeable battery of an electric vehicle on an external charging device, comprising:
   a battery capacity unit, for detecting charging state of the rechargeable battery;
   a lifetime unit, for detecting lifetime of the rechargeable battery;
   an information collecting unit, for determining cycle count and health state of the rechargeable battery;
   a processor for confirming identification of the rechargeable battery to determine ownership of the rechargeable battery, wherein the rechargeable battery is charged only when confirmation is positive; and
   a display unit, connected to the battery capacity unit, lifetime unit and information collecting unit, for displaying the charging state, lifetime, cycle count and health state of the rechargeable battery on the external charging device outside of the rechargeable battery such that information of the rechargeable battery is shown on the external charging device while electrically connected to the rechargeable battery.

2. The display device according to claim 1, further comprising a converter for converting the charging state, lifetime, cycle count and health state of the rechargeable battery into user-friendly data before displayed by the display unit.

3. The display device according to claim 1, further comprising a transmitter for transmitting the charging state, lifetime, cycle count and health state of the rechargeable battery to a remote computer via local area network (LAN), wide area network (WAN), wireless LAN or wireless WAN.

4. The display device according to claim 1, further comprising a power unit for providing power.

5. The display device according to claim 1, wherein the display device is powered by the external charging device.

6. The display device according to claim 1, further comprising a memory unit for recording the charging state, lifetime, cycle count and health state of the rechargeable battery each time when the rechargeable battery is connected to the display device.

7. The display device according to claim 1, wherein the display unit is a liquid crystal display (LCD) or light emitting diode (LED) indicators.

8. The display device according to claim 1, wherein the information collecting unit calculates remaining capacity to full charge and health state of the rechargeable battery.

9. A charging module for charging a rechargeable battery of an electric vehicle, comprising:
   a charging unit, for providing electric power to the rechargeable battery; and
   a display device according to claim 1.

* * * * *